United States Patent [19]

von Skarczinski

[11] Patent Number: 4,724,295

[45] Date of Patent: Feb. 9, 1988

[54] METHOD AND APPARATUS FOR PRESSURE WELDING STACKED METAL FOILS

[75] Inventor: Albrecht von Skarczinski, Berlin, Fed. Rep. of Germany

[73] Assignee: Siemens Aktiengesellschaft, Munich, Fed. Rep. of Germany

[21] Appl. No.: 13,416

[22] Filed: Feb. 11, 1987

[30] Foreign Application Priority Data

Feb. 13, 1986 [DE] Fed. Rep. of Germany ....... 3604782

[51] Int. Cl.[4] ............................................. B23K 11/16
[52] U.S. Cl. ............................... 219/117.1; 219/78.01; 219/91.2
[58] Field of Search ............... 219/78.01, 78.02, 79, 219/80, 86.24, 86.41, 91.1, 91.2, 110, 117.1, 158, 161; 269/24

[56] References Cited

U.S. PATENT DOCUMENTS

| | | | |
|---|---|---|---|
| 1,478,226 | 12/1923 | Henry | 219/78.01 |
| 2,250,617 | 7/1941 | Argentin | 219/91.2 |
| 4,130,750 | 12/1978 | Bennett et al. | 219/161 X |
| 4,168,430 | 9/1979 | Denis et al. | 219/110 X |
| 4,493,964 | 1/1985 | Shigemasa | 219/78.01 X |

FOREIGN PATENT DOCUMENTS 210130 1/1924 United Kingdom .

Primary Examiner—Clifford C. Shaw
Assistant Examiner—C. M. Sigda
Attorney, Agent, or Firm—Kenyon & Kenyon

[57] ABSTRACT

A method for the local joining of stacked metal foils by electric pressure welding provides for receiving the foil stack between holding jaws which are arranged movably and tiltably. Thereby, pressure welds can be carried out successively at both ends of the foil stack without manual intervention. In an apparatus suitable for carrying out the method, the holding jaws consist of a highly heat-conducting material and contain a coolant canal. The clamping surfaces of the holding jaws are curved in the same direction and are interleaved. The curvature represents a substitute shape for a curvature given if the finished welded foil stack is in use.

10 Claims, 9 Drawing Figures

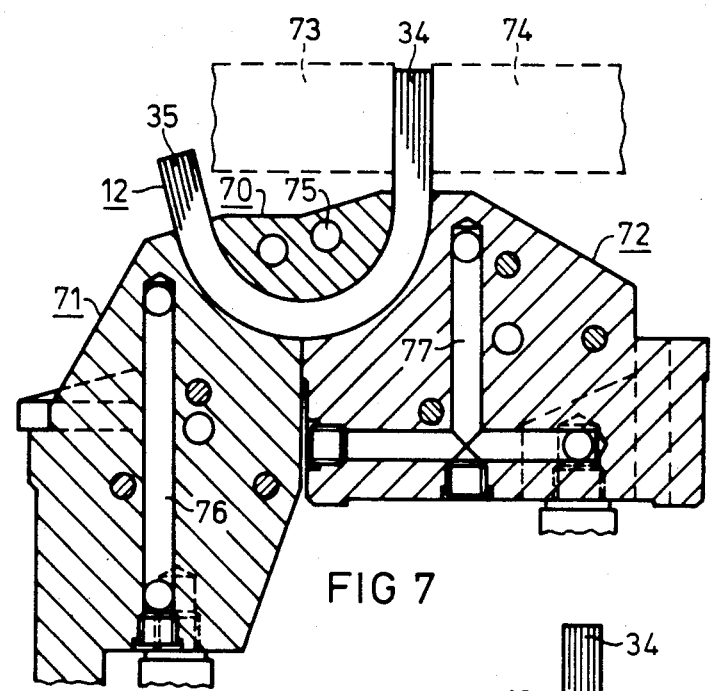
FIG 7
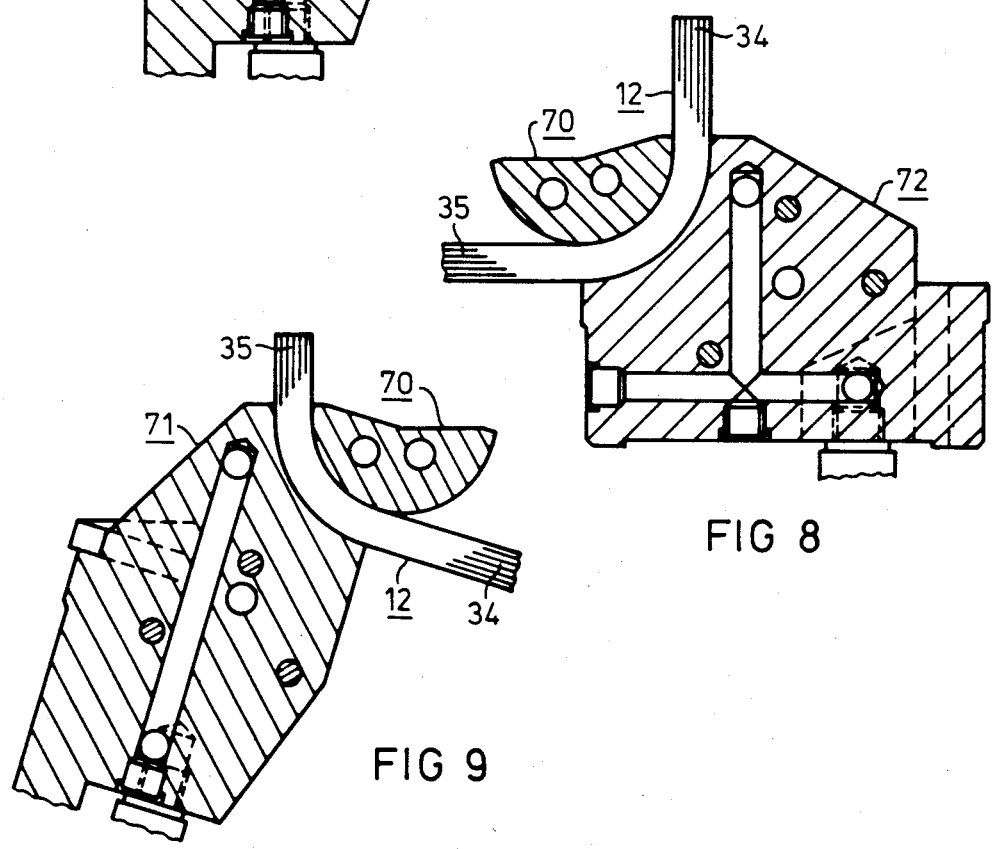
FIG 8
FIG 9

METHOD AND APPARATUS FOR PRESSURE WELDING STACKED METAL FOILS

BACKGROUND OF THE INVENTION

The present invention relates to a method for the local joining of stacked metal foils in strip form by electric pressure welding at both ends of the foil stack, with welding electrodes for conducting a welding current through the region of the foil stack to be joined together, as well as with a device for removing heat from the foil stack.

Flexible current-carrying ribbons fabricated in accordance with such a method are frequently employed especially in electrotechnology where parts movable relative to each other are to be connected to each other electrically. Fields of application of such current-carrying ribbons are therefore primarily all kinds of power circuit breakers and switching systems. The metal foils are connected to each other by pressure welding mechanically and in an electrically conducting manner, so that it is assured when a terminal connection is made that the current to be transmitted is distributed uniformly over all metal foils.

As materials for fabricating such current-carrying ribbons of metal foil can be considered particularly the conductor materials copper and aluminum, which are generally used in electrotechnology. Considering that the mobility of the parts to be joined together should be impeded as little as possible, it is necessary to use resilient metal foils. The difficulty arises here that aluminum as well as copper have by nature only insufficient spring properties and it is therefore necessary to subject the foils to a rolling treatment in order to give sufficient spring hardness to the material. If, however, the foils are subjected to temperatures above the recrystalization temperature, they lose their springness. In order to prevent this influence in the manufacture of current-carrying ribbons of foil stacks as far as possible, pressure welding has heretofore been performed in a water bath, since thereby the heat influence of pressure welding remains substantially limited to the pressure areas of the welding electrodes.

In a flame welding method, it is already known to use indirect cooling instead of a water bath. To this end, a liquid coolant is conducted through cavities in holding jaws, between which the parts to be welded together are clamped (British Pat. No. A-210,130).

SUMMARY OF THE INVENTION

According to the invention, an economical fabrication of current-carrying ribbons is achieved, starting with the method described above by the following steps applied sequentially on the basis of a timing control:
 (a) reception of a prepared stack of foils between holding jaws, with the ends of the stack of foils overhanging on both sides;
 (b) transfer of the holding jaws into a ready position provided near the welding electrodes;
 (c) transfer of the holding jaws from the ready position into an operating position, in which the one end of the foil stack protrudes between the welding electrodes;
 (d) applying the welding electrodes to the one end of the foil stack, conducting a welding current through the stack of foils and exposing the holding jaws to a coolant;
 (e) turning off the welding current and disengaging the welding electrodes;
 (f) transfer of the holding jaws from the operating position into the ready position;
 (g) tilting the holding jaws for positioning the other end of the foil stack for pressure welding;
 (h) logically carrying out steps (c), (d), (e), and (f).

By this method, the pressure welds are made at both ends of a foil stack immediately following each other, wherein the stack of foils remains continuously clamped between the holding jaws and any additional manual handling is eliminated thereby.

In an advantageous further embodiment of the method described above, the stack of foils can be clamped between the holding jaws only near the ends to be welded if the welding electrodes operate horizontally. It is achieved thereby that the part of the foil stack which is not to be brought into contact with the welding electrodes remains movable and therefore can be kept away particularly from the operating range of the welding electrodes. This modification of the method therefore permits the manufacture of a great variety of different forms of current-carrying ribbons in the same manner.

For carrying out the method in the one or the other form, apparatus with the following features can be employed:

For holding the foil stack during the welding operation, two holding jaws of highly heat-conducting material are provided which are arranged movably relative to each other and each have at least one canal for conducting a coolant through it, the holding jaws have clamping surfaces formed interleaved and curved in the same sense forming a substitute shape for the shape of the completely welded foil stack when in use, expecially as a current-carrying ribbon.

Due to this shape of the holding jaws, the current-carrying ribbons are given not only the shape required for their intended purpose, but it is also achieved that the tilting motion to be carried out between the pressure welding of the one end of the stack of foils and the other end remains limited to a small angle.

As already mentioned above, it is important for maintaining the spring property of the metal foils to confine the influence range of the welding heat to the welding zone proper as far as possible. The flush contact of the foil stack desired for this purpose against the holding jaws can be aided by the provision that at least one of the two holding jaws is designed divided and that these sections can be moved by separate driving means. It is, in particular, advantageous to provide one inner, undivided, outward-curved holding jaw and two outer holding jaws resting against the inner holding jaw which cover only the region adjacent to the end of the foil stack to be welded, and that the outer holding jaws are movable successively in such a manner that first, the first outer holding jaw can be placed against the foil stack; that after the welding process is carried out, the second outer holding jaw can be moved toward the foil stack; and subsequently, the first outer holding jaw can be removed. It is achieved thereby that always part of the foil stack which is facing away from the end to be welded, is freely movable without clamping and therefore within the limit of its flexibility. Due to its springiness, this part occupies a substantially stretched-out position, whereby this facing-away end is removed from the operating range of the welding electrodes. This apparatus therefore permits processing also relatively short foil stacks which are to be fabricated with a relatively great curvature, and with which, if completely clamped between the curved holding jaws, unimpeded access of the welding electrodes would otherwise not be assured.

The holding jaws of the device can further be arranged movably in the vertical and horizontal direction as well as tiltably, where the travel distance, for the purpose of taking over a foil stack prepared outside of the device, is designed amply up to the edge region of the apparatus, and where the tilting travel distance is made for placing successively both ends of the foil stack to be welded into the operating range of the welding electrodes.

As already mentioned, it is important for the quality of current-carrying ribbons that the metal foils keep their springiness even though heat is applied by the pressure welding. For this purpose, a switching device for influencing the welding current can be provided according to one further embodiment of the invention which can be controlled as a function of the temperature of the weld. This can be accomplished by means of an infrared detector which can pick up the temperature of a relatively narrowly defined spot of the workpiece from a distance. The measurement of temperature at a weld by means of an infrared detector and influencing the welding current thereby is known per se (Patent Abstracts of Japan, Vol. 7, No. 199 (M-240) 1344 of Sept. 3, 1983).

Two infrared detectors may be provided which point toward different spots of the end of the foil stack to be welded, and the switching device can have two switching stages operative in dependence on the measured temperature, the first of which causes a reduction of the welding current and the second an interruption of the welding current. It is achieved thereby that the region to be welded is initially heated up quickly by a relatively large current and that subsequently the highest desired temperature is reached without danger of local overheating. In this connection, it has been found to be advantageous to direct the two infrared detectors to the corner zones at the end faces of the foil stack to be received between the welding electrodes. For, at these points the heat outflow is a minimum, so that accordingly, the danger of overheating is a maximum there.

For increasing the quality of the welded joints, a d-c current obtained by rectification of a multiphase a-c current can serve instead of the commonly used a-c current. This is accompanied by a number of advantages; in particular; there is less of a tendency of forming splatter during the welding; the welding current is smaller and the zone of the heat influence remains more closely defined. Furthermore, there is no vibration, so that the device is protected and the annoyance of the operators by noise is reduced.

BRIEF DESCRIPTION OF THE DRAWINGS

The invention will be explained in the following in greater detail by reference to the embodiment shown in the figures, in which:

FIG. 7 shows a further embodiment of holding jaws, two outer separately movable holding jaws being provided; and FIG. 8 shows how a stack of foils is clamped between an inner and one of the outer holding jaws (FIG. 7); and FIG. 9 shows the clamping between the inner holding jaw and the other outer holding jaw.

DETAILED DESCRIPTION

Figure 1:
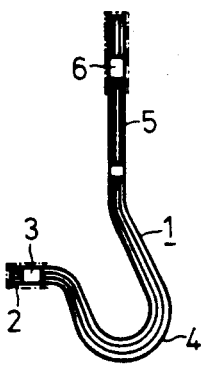
FIG. 1 shows a current-carrying ribbon provided for use in a low-voltage circuit breaker.

In FIG. 1 a current-carrying ribbon 1 is shown which is provided for connecting a stationary clamping point to a movable contact in the contact apparatus of a low-voltage circuit breaker. The current-carrying ribbon 1 consists of a number of thin foils of copper sheet, for instance, 120 foils 0.05 mm thick. The width of the foils can be chosen according to the required current- carrying capcity of the current-carrying ribbon 1, for instance, so that a continuous current of 1000 A can be carried. In FIG. 1, the current-carrying ribbon 1 is shown in the form which it occupies in the installed condition. For connecting them to a stationary contact, the foils of the current-carrying ribbon are connected to each other by pressure welding at the lower end for forming a contact region 2 approximately over the length of the marking drawn dashed-dotted in FIG. 1. An opening 3 is provided for a clamping screw to pass. Adjacent to the connecting area 2 is an approximately U-shaped, curved region 4 which makes a transition to an upper straight connecting region 5, of which the part likewise marked dashed-dotted is again connected by pressure welding. The contact region 5 contains likewise a passage opening 6 for a clamping screw so that the current-carrying ribbon 1 can be connected, for instance, to a movable contact lever. The arrangement of current-carrying ribbons within a circuit breaker can be seen, for instance, from U.S. Pat. No. 3,550,049 and will therefore not be explained in detail in the following.

Figure 2:
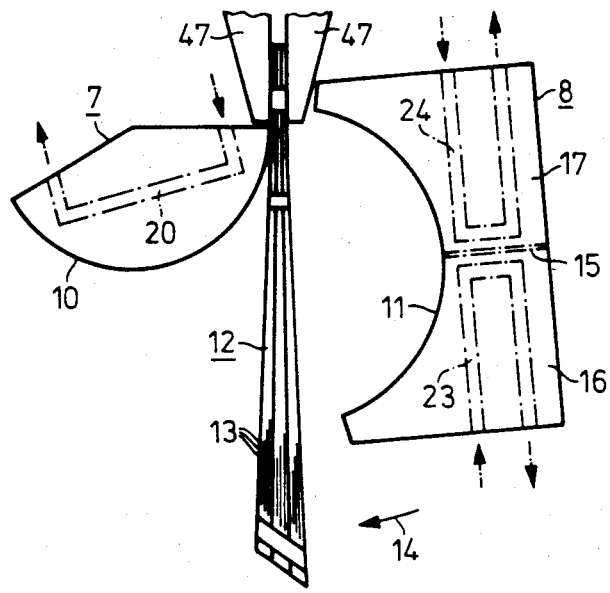
FIG. 2 shows holding jaws in connection with a stack of foils to be joined at the ends by pressure welding.

As part of a device for manufacturing current-carrying ribbons, holding jaws 7 and 8 which are arranged tiltably relative to each other are shown in FIG. 2. Both holding jaws have interleaving cylindrically curved clamping surfaces 10 and 11, the radii of which are designed differently corresponding to the thickness of a foil stack 12 prepared for manufacturing a current-carrying ribbon 1. The mean curvature of the clamping surfaces 10 and 11 is chosen here so that in the result it corresponds to the shape of the finished current-carrying ribbon 1 shown in FIG. 1 and thus, the end of the individual foils 13 are terminated flush if the holding jaws 7 and 8 are closed and the individual foils are made with different lengths corresponding to their position in the foil stack, as is shown schematically in FIG. 2.

Figure 3:
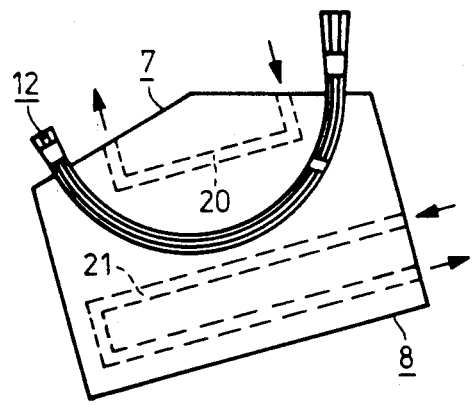
FIG. 3 shows the holding jaws according to FIG. 2 in the closed condition.

The clamping device is closed by tilting the holding jaw 8 in the direction of an arrow 14 shown in FIG. 2, whereby the parts occupy the position shown in FIG. 3. Due to the accurate correlation of the radii of curvature of the clamping surfaces 10 and 11 and the thickness of the foil stack 13, the holding jaws rest completely flush against the stack of foils. The relative motion of the holding jaws 7 and 8 which can be seen by a comparison of FIGS. 2 and 3 can be generated by a practical arrangement of pneumatic or hydraulic working cylinders as is generally customary in machine tool technology. It is therefore not necessary to discuss the design and control of such pressure cylinders under the present application.

It is essential for the result of the welding operation yet to be explained that the holding jaws 7 and 8 rest accurately against the stack of foils 13 particularly in their edge regions in order to assure a heat transfer as unimpeded as possible. To this end, it is advisable to introduce the pressure force between the holding jaws 7 and 8 in such a manner that the holding jaws can be aligned relative to each other unimpeded. In addition, it may be advantageous to design the holding jaw 8 divided with a clamping surface 11 curved inwards, in order to achieve an easier alignment relative to the holding jaw 7 with the outward-curved clamping surface 10. In this manner a tolerance of the thickness of the foil stack 13 can be accomodated within certain limits. An example for a divided design of the one holding jaw is shown dashed in FIG. 2. In this case, two symmetrical jaw sections 16 and 17 are formed by a parting gap 15 and are movable together, but independently of each other.

In order to confine the influence of heating during the pressure welding to the welding zones as far as possible, effective cooling of the stack of foils 12 is essential. For this purpose not only the already mentioned flush contact of the holding jaws 7 and 8 against the foil stack 12 is essential but also the heat conduction of the holding jaws. Copper, for instance, is therefore well suited as the material for making the holding jaws 7 and 8. In addition, the holding jaws are provided with one or more canals for conducting a liquid coolant, particularly water. One approximately U-shaped canal 20 and 21 each can be seen in FIG. 3. In dependence on the width of the holding jaws 7 and 8, also several canals of the form shown can be provided in a parallel arrangement. If the arrangement with symmetrical jaw sections 16 and 17 is chosen, each of these jaw sections contains one or more canals 23 and 24.

Figure 4:
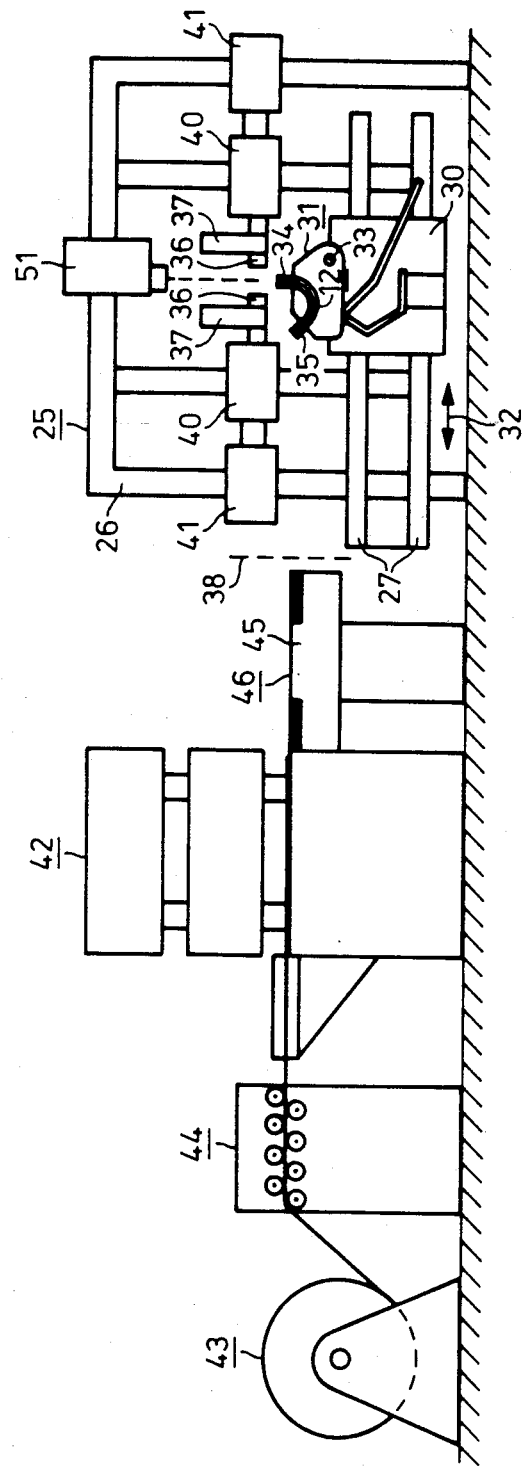
FIG. 4 is a schematic view of a device for the fabrication of current-carrying ribbons in connection with a cutting device.

The arrangement of a clamping device explained with reference to FIGS. 2 and 3 within the overall device can be seen from FIG. 4. A device 25 shown there comprises those components which are required to pressure-weld prepared foil stacks 12 at both ends 34 and 35. To this end the device 25 comprises a frame 26 to which horizontal guide rails 27 for a slide 30 are mounted which supports a clamping device comprising holding jaws according to FIGS. 2 and 3 and are designated as a whole with 31. By means of a slide 30, the clamping device 31 can be moved horizontally in the direction of the double arrow 32. The clamping device 31 is further mounted to the slide 30 tiltably about a pivot bearing 33 and movably vertically in such a manner that the ends 34 and 35 can be brought successively into the operating range of two welding electrodes 36 which are arranged opposite each other. The welding electrodes which are fastened detachably to the holders 37 are movable horizontally by means of guiding bodies 40 and can be acted upon by a pressure force by means of pressure cylinders 41 arranged in the extension of the guide axis. The guiding bodies 40 and the pressure cylinders 41 are fastened to vertical struts of the frame 26.

The device 25 is preceded by a stamping device 42 which provides metal strip provided for the manufacture of current carrying ribbon such as copper or aluminum, after being taken from a supply reel 43 and passage through a straightener 44, with perforations corresponding to the holes 3 and 6 in FIG. 1, and cuts sections with the required length from the strip. A number of individual foils required is stacked on the deposition table 45 of a transfer device 46 and held in readiness for transfer by the clamping device 31. To this end, the clamping device 31 is moved on the guiding rails 27 to the left edge area 38 of the device 25 in the direction of the arrow 32 and is kept in readiness for transfer by the clamping device 31. To this end, the clamping device 31 is moved on the guiding rails 27 to the left edge area 38 of the device 25 in the direction of the arrow 32 and is kept in readiness in the vertical position by means of gripping jaws 47 shown in FIG. 2, to be picked up by the holding jaws 7 and 8.

Subsequently, the stack of foils 12 (FIG. 2) is moved on the guiding rails 27 into the ready position shown in FIG. 4 and is then moved vertically upwards until the end 34 of the foil stack 12 gets between the welding electrodes 36 (operating position). The latter are then pressed against the ends of the foil stack 12 by means of the pressure cylinders 41. By subsequently conducting a current of suitable magnitude, the foils are joined together in a manner known per se. By the heat capacity of the holding jaws 7 and 8 as well as the coolant conducted through the holding jaws, provision is made that the heating remains confined essentially to the contact area of the welding electrodes at the foil stack 12 and the properties of the metal foils adjacent to the welding zone are influenced adversely as little as possible.

Following the pressure welding of the end 34, the holding device 31 is lowered from the operating position into the ready position. After a movement to the right and a tilting movement, the holding device is now brought vertically upward into the operating position again in which the end 35 now extends between the welding electrodes 36. After the second pressure weld, the foil stack 12 has thus been joined to form a finished current-carrying ribbon. In order to obtain current transmission with little heating in the installation into switchgear, it can further be advantageous to tin-plate or silverplate the ends 34 and 35.

The described processes can be carried out periodically by moving, subsequently to the manufacturing cycle described, the clamping device 31 toward the left again to the edge region 38 of the device 25 for taking-over a further foil stack 12 from the transfer device 46. These processes can be carried out automatically by means of a conventional timing device.

Since different current-carrying ribbons are required for manufacturing a series of switching devices, it is necessary to control the magnitude of the welding current and the duration of the current flow accurately, so that a uniform quality of the welds is obtained independently of the cross section of the foil stacks to be welded. This is achieved by a switching device 50 according to FIG. 5 which can be controlled as a function of the temperature and will be explained in the following. In this figure the holding jaws 7 and 8 as well as the foil stack clamped between them are shown broken off. The free end 34 of the foil stack 12 is located between the welding electrodes 36, the holders 37 of which are likewise shown broken off. An infrared detector 51 is arranged above the free ends 34 of the foil stack 12 and determines the temperature at the end face of the free end 34. The infrared detector 51 may be arranged at the frame 26 of the device 25 in a manner shown in FIG. 4. A further infrared detector 52 is arranged so that it determines the temperature near the holding jaws 6 and 7. In this manner measurement values for the temperature of the foil stack 12 during the welding process are obtained. If certain limits are measured, control signals arrive at the switching device 50 and cause switching actions yet to be explained.

The switching device 50 is connected into the circuit 54 of a power supply device 53 which is preferably supplied from the three-phase network and converts three-phase current into d-c current. This is more advantageous than using single-phase a-c current as the welding current, since on the one hand, the primary phase current taken from the network is substantially smaller, only very little noise and vibration occurs and no current displacement takes place in the required large conductor cross sections. In addition, a better quality of the welded joints is obtained. The power supply device 53 permits taking off currents of different magnitude, it being assumed, for simplifying the presentation, that the current I flowing in the welding circuit 54 is composed of a summation of two partial currents I1 and I2 which can be taken from the power supply 53. The different magnitude of the current can be affected, of course, by any sutiable means, for instance, a gating control with thyristors.

Figure 5:
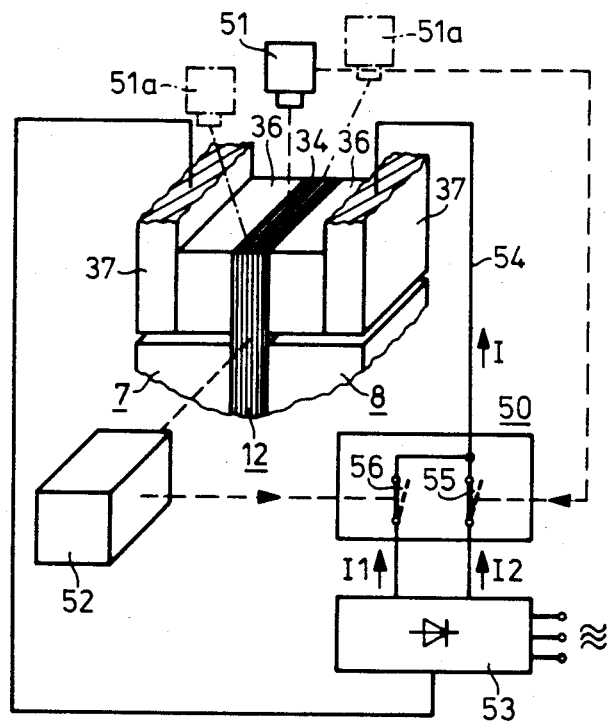
FIG. 5 is a schematic circuit diagram of a switching device for controlling the temperature cycle during the pressure welding.
Figure 6:
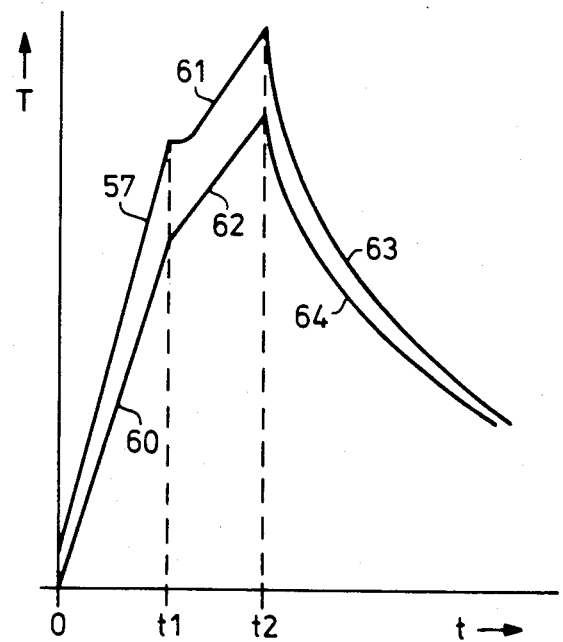
FIG. 6 is a diagram for showing the dependence of the temperature within the foil stack on the time during the pressure welding.

If both switch contacts 55 and 56 contained in the switching device 50 are closed, the current I corresponds to the sum of the partial currents I1 and I2. This brings about a temperature rise at the spots of the end 34 of the foil stack 12 covered by the infrared detectors 51 and 52, as can be seen in FIG. 6. The branch 57 of the current curve with a steeper slope corresponds here to the measuring point of the infrared detector 51, while the branch 60 of the curve corresponds to the measuring point of the infrared detector 52. As will be seen, the temperatures of both measuring points reached at the time t1 are different. This is due to the fact that, because the foil stack 12 is clamped between the holding jaws 7 and 8, heat is removed to a greater degree than is the case at the end face at the upper end of the foil stack 12. The limit generators of the infrared detectors 51 and 52 are now set so that they deliver output signals if a maximally permissible and a lower required temperature are reached. In FIG. 5, it is indicated by dashed lines that the control signals of the infrared detectors 51 and 52 cause the switch contact 55 and 56, respectively, of the switching device 50 to open and thereby interrupt the partial currents I1 and I2, respectively.

First, the switch contact 55 is therefore opened by means of the infrared detector 51. The further rise of the temperature now proceeds with a reduced slope, as the branches 61 and 62 in FIG. 6 show. In this manner it is achieved that up to a time t2 both points do not reach an excessive temperature which is sufficient for proper welding but is otherwise not too high and would be accompanied by scaling or melting. At the time t2, the infrared detector 52 causes the switch contact 56 to open and thereby, a complete interruption of the welding current. The branches 63 and 64 of the curve show how the temperature drops asymptotically after the welding current is switched off.

It should further be mentioned for a better understanding of the temperature curve shown in FIG. 6 as a function of time, that the temperature, if the foils consist of copper, should not exceed 1000° C., while the temperature should not fall below 800° C. for obtaining a strong pressure weld. These temperatures are reached after about 10 to 40 seconds, depending on the volume of the region to be joined by the pressure welding and the magnitude of the current I.

As will readily be seen from FIG. 5, it is possible to determine the temperature in narrowly defined regions of the foil stack 12 by suitable alignment of the infrared detectors 51 and 52. It is therefore advisable to determine by tests where the critical points are located, and to position the infrared detectors accordingly. By means of the device 25, current-carrying ribbons of different dimensions and weight can therefore be manufactured with uniform quality.

In this connection, two infrared detectors 51a are shown dash-dotted in FIG. 5 and are pointed toward the corner regions of the end face of the end 34 of the current-carrying ribbon 12. Thereby, those places are covered at which the heat outflow is a minimum and therefore, the danger of overheating is greatest. Always the higher of the two measured temperatures leads to the actuation of the switching device 50 and thereby to reducing and later interrupting the welding current. If the infrared detector 51a is used, the further measuring point with the infrared detector 52 can be eliminated.

In the following, an arrangement with divided holding jaws will be described by reference to FIGS. 7, 8 and 9. As these figures show, two outer holding jaws 71 and 72 are arranged opposite an inner undivided holding jaw 70 and extend over the foil stack 12 without gap if both rest against the foil stack 12, corresponding to FIG. 7. This condition, however, exists only for a short time as will be explained later. As already mentioned above, the holding jaws contain canals for conducting a coolant through them. To this end, the inner holding jaw 70 is provided with a canal 75, while the coolant canals in the holding jaws 71 and 72 are designated with 76 and 77, respectively. In FIG. 7, welding electrodes 73 and 74 are further indicated dashed, which are horizontally movable for placement against the end 34. Due to the given length of the foil stack 12 and in consideration to the equivalent curvature of the holding jaws chosen for the later use as a current-carrying ribbon, the end 35 of the foil stack 12 therefore protrudes into the path of the lefthand welding electrode 73. Unimpeded operation is nevertheless made possible by the provision that the foil stack 12 is clamped only between the inner holding jaw 70 and one of the two outer holding jaws 71 and 72, as is shown in FIGS. 8 and 9.

The position of the parts according to FIG. 8 will be considered first. Here, the end 34 occupies the same position with respect to the welding electrodes 73 and 74 in FIG. 7, but the not gripped part of the foil stack 12 can occupy a stretched position due to the springiness, so that it is now located outside the operating range of the welding electrodes 73 and 74. If the pressure weld is completed at the end 34, the arrangement is moved, as already explained before, from the operating position into the ready position, i.e., vertically down. Subsequently, the holding jaw 71 is likewise applied to the foil stack 12, so that now, the position according to FIG. 7 prevails. Subsequently, the holding jaw 72 is removed so that now the already welded end 34 occupies a more or less stretched position for instance, in accordance with FIG. 9, due to its springiness and its weight. Subsequently, the arrangement of the holding jaws 70 and 71 is tilted in such a manner that now the end 35 occupies the vertical position suitable for the engagement of the welding electrodes 73 and 74. Starting therefrom, the arrangement is brought again from the ready position into the operating position.

A device with separately movable outer holding jaws corresponding to FIGS. 7, 8 and 9, is therefore suitable for processing foil stacks of different lengths, since in any case unimpeded access of the welding electrodes is possible. It is merely necessary to use the holding jaws with the suitable radius of curvature and suitable width into the device as interchangeable tools. Uniform coupling parts for the engagement of situating devices, for instance, of pneumatic or hydraulic cylinders for the motion cycle and feeding-in a coolant see to it that the tool change can be carried out without great effort.

In the foregoing specification, the invention has been described with reference to specific exemplary embodiments thereof. It will, however, be evident that various modifications and changes may be made thereunto without departing from the broader spirit and scope of the invention as set forth in the appended claims. The specifications and drawings are, accordingly, to be regarded in an illustrative rather than in a restrictive sense.

What is claimed is:

1. A method for the local joining of stacked metal foils in strip form by electrical pressure welding at both ends of the foil stack, with welding electrodes for conducting a welding current through the region of the foil stack to be joined and wherein a means for heat removal from the foil stack is provided, the method comprising the following steps performed sequentially by a cycle control system:
    (a) receiving a prepared stack of foils between holding jaws with ends of the foil stack overhanging on both sides;
    (b) transferring the holding jaws into a ready position provided near the welding electrodes;
    (c) transferring the holding jaws from the ready position into an operating position in which one end of the foil stack protrudes between the welding electrodes;
    (d) applying the welding electrodes to the one end of the foil stack, conducting a welding current through the stack of foils and exposing the holding jaws to a coolant;
    (e) turning off the welding current and disengaging the welding electrodes;
    (f) transferring the holding jaws from the operating position into the ready position;
    (g) tilting the holding jaws for positioning the other end of the foil stack for the pressure welding; and
    (h) similarly carrying out steps (c), (d), (e) and (f) in succession for the other end.

2. The method recited in claim 1, wherein, with horizontal operation of the welding electrodes, the foil stack is clamped only near the ends to be welded between the holding jaws.

3. Apparatus for the local joining of stacked metal foils in strip form by electrical pressure welding at both ends of the foil stack, comprising welding electrodes for conducting a welding current through the region of the foil stack to be joined and wherein a means for heat removal from the foil stack is provided, the apparatus further comprising:
    means for receiving a prepared stack of foils between holding jaws with ends of the foil stack overhanging on both sides;
    means for transferring the holding jaws from a ready position provided near the welding electrodes into an operating position in which one end of the foil stack protrudes between the welding electrodes and for transferring the holding jaws from the operating position back into the ready position after welding;
    means for applying the welding electrodes to the one end of the foil stack for conducting a welding current through the stack of foils and for exposing the holding jaws to a coolant;
    means for turning off the welding current and for disengaging the welding electrodes; and
    means for tilting the holding jaws for positioning the other end of the foil stack for pressure welding of the other end;
    and further wherein:
    said holding jaws comprises two holding jaws which are arranged movably relative to each other comprising highly heat-conducting material which have at least one canal each for conducting a coolant therethrough;
    the holding jaws having clamping surfaces which are formed so as to interleave, with a curvature in the same direction and forming a substitute form for the shape of the finished, welded foil stack when in use.

4. The apparatus recited in claim 3, wherein at least one of the two cooperating holding jaws is designed divided and the sections thereof can be moved by separate driving means.

5. The apparatus recited in claim 3, wherein an inner outwardly curved holding jaw and two outer holding jaws which bias the foil stack against the inner holding jaw are provided which cover only the region of the foil stack adjoining the end of the foil stack, and the outer holding jaws can be moved successively such that initially, the first outer holding jaw can be placed against the foil stack; the second outer holding jaw can be moved against the foil stack and subsequently, the first outer holding jaw can be removed.

6. An apparatus for the local joining of stacked metal foils in strip form by electrical pressure welding at both ends of the foil stack, comprising welding electrodes for conducting a welding current through the region of the foil stack to be joined and wherein a means for heat removal from the foil stack is provided, the apparatus further comprising:
    means for receiving a prepared stack of foils between holding jaws with ends of the foil stack overhanging on both sides;
    means for transferring the holding jaws from a ready position provided near the welding electrodes into an operating position in which one end of the foil stack protrudes between the welding electrodes and for transferring the holding jaws from the operating position into the ready position after welding;
    means for applying the welding electrodes to the one end of the foil stack, for conducting a welding current through the stack of foils and for exposing the holding jaws to a coolant;
    means for turning off the welding current and for disengaging the welding electrodes; and
    means for tilting the holding jaws for positioning the other end of the foil stack for pressure welding of the other end;
    and further wherein:
    the holding jaws are arranged vertically and horizontally movably as well as tiltably, a travel path thereof, for transferring a foil stack prepared for transfer outside the apparatus extending up to an edge region of the apparatus, the tilting path of the successive placing of both ends of the foil stack to be welded extending into the operating range of the welding electrodes.

7. Apparatus for the local joining of stacked metal foils in strip form by electrical pressure welding at both ends of the foil stack, with welding electrodes for conducting a welding current through the region of the foil stack to be joined and wherein a means for heat removal from the foil stack is provided, the apparatus further method comprising:

means for receiving a prepared stack of foils between holding jaws with ends of the foil stack overhanging on both sides;

means for transferring the holding jaws from a ready position provided near the welding electrodes into an operating position in which one end of the foil stack protrudes between the welding electrodes and for transferring the holding jaws from the operating position into the ready position after welding;

means for applying the welding electrodes to the one end of the foil stack, for conducting a welding current through the stack of foils and for exposing the holding jaws to a coolant;

means for turning off the welding current and for disengaging the welding electrodes; and means for tilting the holding jaws for positioning the other end of the foil stack for pressure welding of the other end;

and further comprising:

a switching device which can be controlled as a function of the temperature of the welding spot for influencing the welding current, the switching device being associated with an infrared detector for obtaining a temperature-dependent control signal.

8. The apparatus recited in claim 7, wherein two infrared detectors are provided, of which one points to the end face of the free end of the foil stack and a second points to the region of the foil stack near the holding jaws, the switching device having two switching stages operative as a function of the temperature at the free end of the foil stack and being a function of the temperature near the holding jaws, of which the first causes a reduction of the welding current and the second, the interruption of the welding current.

9. The apparatus recited in claim 7, wherein two infrared detectors are provided which point to the corner regions on the end face of the end of the foil stack to be accepted between the welding electrodes.

10. An apparatus for the local joining of stacked metal foils in strip form by electrical pressure welding at both ends of the foil stack, with welding electrodes for conducting a welding current through the region of the foil stack to be joined and wherein a means for heat removal from the foil stack is provided, the apparatus further comprising:

means for receiving a prepared stack of foils between holding jaws with ends of the foil stack overhanging on both sides;

means for transferring the holding jaws from a ready position provided near the welding electrodes into an operating position in which one end of the foil stack protrudes between the welding electrodes and for transferring the holding jaws from the operating position into the ready position after welding;

means for applying the welding electrodes to the one end of the foil stack, for conducting a welding current through the stack of foils and for exposing the holding jaws to a coolant;

means for turning off the welding current and for disengaging the welding electrodes; and means for tilting the holding jaws for positioning the other end of the foil stack for pressure welding of the other end;

and further wherein:

the welding current is a d-c current obtained from a power supply device by rectification of multiphase a-c current.

* * * * *